United States Patent Office 2,989,503
Patented June 20, 1961

2,989,503
PRODUCTION OF POWDERED POLYCARBONATES
Bart Paul Jibben, Arnhem, Netherlands, assignor, by mesne assignments, to N.V. Onderzoekingsinstituut Research, Arnhem, Netherlands, a corporation of the Netherlands
No Drawing. Filed Apr. 28, 1959, Ser. No. 809,345
Claims priority, application Netherlands May 19, 1958
8 Claims. (Cl. 260—47)

This invention relates to a process for the preparation of polycarbonates and more particularly to a process for the preparation of macromolecular polycarbonates in powdered or granular form.

Polycarbonates may be prepared by reacting 2,2-(4,4'-dihydroxydiphenyl)-propane with phosgene or chlorocarbonic acid esters of 2,2-(4,4'-dihydroxydiphenyl)-propane in the presence of dichloromethane, trichloromethane or mixtures thereof. The polycarbonate is then obtained in solution in the dichloromethane, trichloromethane or mixtures thereof.

The known method of obtaining the polycarbonate in powdered form is to evaporate this solution which on evaporation yields a hard tough mass. This mass is then ground into a powder. It is very difficult to remove all of the solution from the mass, thereby necessitating high temperatures and prolonged evaporation which materially increases the cost of the operation. In addition, the hard mass of polycarbonate is very difficult to handle while grinding, which also adds to the cost of the operation.

Therefore, it is an object of this invention to overcome the difficulties of the prior art.

It is a further object of this invention to provide a process for the preparation of macromolecular polycarbonate in powdered or granular form.

Another object of this invention is to provide an economical and simple process for the preparation of macromolecular polycarbonates in powdered or granular form.

These and other objects will become apparent from the following detailed description.

In accordance with the present invention, the foregoing objects are accomplished by adding to the solution of the polycarbonate in dichloromethane, trichloromethane, or mixtures thereof, water and at least 2 cc. of dimethylbenzene per gram of polycarbonate. Upon evaporation of this mixture, the polycarbonate is obtained in the form of a powder or a coarsely divided brittle mass which may be easily triturated to a powder. The powdered form is retained even after the polycarbonate is subjected to a drying operation.

The polycarbonate in powder form may readily be used for coating objects or for preparing spinning solutions to be used in the production of threads and filaments. Also, it finds utility in the preparation of solutions for the production of films and foils.

The polycarbonates in powdered form are not very suitable for use in conventional injection molding and extrusion apparatus. The conventional method for preparing polycarbonate powder for such use is to compress the powder into pellets. However, it has been found that pellets or granules of polycarbonates suitable for extrusion may be obtained by agitating the mixture of polycarbonate solution, water and dimethylbenzene during the evaporation of the mixture. Upon completion of the evaporation, the polycarbonate is obtained in granular form.

The bulk density of the powdered polycarbonate is less than 0.4 g./cc. whereas the bulk density for the granulated polycarbonate is approximately 0.6 g./cc. Thus there is a considerable difference in size between the powder and granules which renders the granules suitable for extrusion.

The dimethylbenzene that is added to the polycarbonate solution may be 1,2-dimethylbenzene, 1,3-dimethylbenzene, 1,4-dimethylbenzene, or the commercial product referred to as dimethylbenzene, which is a mixture of the foregoing. Whenever dimethylbenzene is used, it is to be understood that it is to be interpreted as including the foregoing.

The amount of dimethylbenzene that is used should be at least 2 cc. per gram of polycarbonate because less than that amount will cause the mixture to agglutinate on evaporation. Thus if 2 to 25 cc., and preferably 10–20 cc., of dimethylbenzene per gram of polycarbonate is used, the polycarbonate is obtained directly in powdered form. If larger quantities, for example 40 cc. per gram, are used the polycarbonate will be obtained as a coarsely divided, brittle mass. This mass may easily be triturated into a powder but the added step and large quantity of dimethylbenzene add to the cost.

The water that is added to the polycarbonate solution along with the dimethylbenzene will normally be present in an amount of 50 cc. to 300 cc. per 100 cc. of dimethylbenzene.

It has been found that for the best results, the amount of polycarbonate in solution in dichloromethane, trichloromethane, or mixtures thereof should be between 20–40 grams per 100 grams of solvent. If the concentration of polycarbonate is too high, it will be difficult, if not impossible, to obtain the polycarbonate in powdered form.

The mixture may be evaporated by heating. However, the preferred method is to pass steam through the mixture to expel the solvents. Thus if steam is used, it is not necessary to add water to the polycarbonate solution because sufficient water will be supplied by the condensation of the steam.

To illustrate the manner in which this invention may be carried out, the following examples are given. It is to be understood, however, that the examples are for the purpose of illustration and the invention is not to be regarded as limited to any of the specific materials or conditions recited therein.

*Example I*

A solution containing 34.4 g. of 2,2-(4,4'-dihydroxydiphenyl)-propane, 17.2 g. of sodium hydroxide, 35.0 mg. of sodium dithionite, 240 cc. of water and 60 cc. of dichloromethane was prepared and maintained at a temperature of 25° C. Phosgene in an amount of 17.9 g. was passed through this solution for 45 minutes. The solution was stirred while the phosgene was passed therethrough. The stirring was continued and 0.75 g. of triethylbenzyl ammonium chloride and 160 cc. of dichloromethane were added to the solution. After three hours of stirring, 160 cc. of dichloromethane was again added to the solution. The total stirring after the introduction of phosgene was for five hours. At this point, the solution separated into two layers, one being polycarbonate in dichloromethane and the other an alkaline layer of water. The polycarbonate layer was removed and washed successively with water, dilute sulfuric acid and water. The dichloromethane solution was then mixed with 760 cc. of dimethylbenzene and 800 cc. of water. The mixture was then evaporated to remove all of the organic solvents. The polycarbonate was obtained as a white powder by filtration and drying in a vacuum at 60° C. The dry powder weighed 0.35 g./cc. and could then be processed into a colorless, clear foil.

*Example II*

A solution of the type described in Example I was treated in a similar manner except that the two additions of dichloromethane consisted of 65 cc. each rather than 160 cc. each. After the three washings, 380 cc. of 1,3-dimethylbenzene and 800 cc. of water were added to the dichloromethane solution of the polycarbonate. After evaporation, filtration, and drying as in Example I, the dry polycarbonate powder thus obtained weighed 0.13 g./cc.

*Example III*

A mixture of 22.8 g. of 2,2-(4,4'-dihydroxydiphenyl)-propane and 35 cc. of pyridine was prepared. While stirring this mixture, a solution containing 7.0 g. of phosgene in 40 cc. of trichloromethane was added dropwise to this mixture over a period of 22 minutes and at a temperature of between −2 to 0° C. Then 155 cc. of dichloromethane was added to the reaction mixture. Thereafter a solution of 3.5 g. of phosgene in 20 cc. of trichloromethane was added dropwise for 15 minutes at a temperature of 0° C. The reaction mixture was then stirred for 40 minutes and the temperature was gradually raised to 16° C. At this point, 200 cc. of dichloromethane was added and the mixture was shaken successively with water, dilute hydrochloric acid and water. A neutral solution of polycarbonate in a mixture of dichloromethane and trichloromethane was thus obtained. This solution was mixed with 400 cc. of dimethylbenzene and 500 cc. of water. Steam was passed through this mixture to remove the solvents from the solution. After filtration and drying in a vacuum at 60° C., the polycarbonate was obtained as a white powder.

*Example IV*

A solution containing 6.66 g. of bis-chlorocarbonic acid ester of 2,2-(4,4'-dihydroxydiphenyl)-propane and 50 cc. of trichloromethane was prepared. A solution of 4.29 g. of 2,2-(4,4'-dihydroxyphenyl)-propane in 5 g. of pyridine and 50 cc. of trichloromethane was added to this solution dropwise for 45 minutes. The solution was stirred and maintained at 0° C. during this addition. Stirring was continued for two hours at room temperature, after which the mixture was shaken successively with water, dilute hydrochloric acid, and water. A solution containing the polycarbonate in trichloromethane was obtained and to this solution was added 100 cc. of dimethylbenzene and 75 cc. of water. Steam was passed through this mixture to evaporate the organic solvents, after which the polycarbonate was obtained as a white powder which was dried in a vacuum at 60° C.

*Example V*

A solution of 2 kg. of polycarbonate, obtained by reacting 2,2-(4,4'-dihydroxydiphenyl)-propane with phosgene, in 15 liters of dichloromethane was mixed with 25 liters of dimethylbenzene and 20 liters of water. Steam was passed through the mixture to remove the organic solvents. During this steam passage, the mixture was stirred. The polycarbonate thus obtained was in granular form, each granule being about 2 mm. in diameter. After drying in vacuum at 60° C., the granules had a bulk density of 0.55 g./cc.

It is apparent from the foregoing that polycarbonates in either powder or granular form may be prepared easily and economically. The product thus obtained is suitable for coating objects or extrusion.

Since many embodiments of this invention may be made without departing from the spirit and scope thereof, it is to be understood that the invention is not limited by the above specific illustrations, except to the extent of the following claims.

What is claimed is:

1. A process for the preparation of powdered macromolecular polycarbonates comprising the steps of reacting 2,2-(4,4'-dihydroxydiphenyl)propane with a compound of the group consisting of phosgene and chlorocarbonic acid esters of 2,2-(4,4'-dihydroxydiphenyl)-propane in the presence of a compound of the group consisting of dichloromethane, trichloromethane and mixtures thereof, obtaining the polycarbonate in solution in said compound, said polycarbonate being present in an amount of 20–40 grams per 100 grams of said compound, mixing said solution with water and at least 2 cc. of dimethylbenzene per gram of polycarbonate, said water being present in an amount of 50 to 300 cc. per 100 cc. of dimethylbenzene, and evaporating said mixture to obtain the polycarbonate in powder form.

2. A process according to claim 1 wherein said dimethylbenzene is present in an amount of 10 to 20 cc. per gram of polycarbonate.

3. A process for the preparation of powdered macromolecular polycarbonates comprising the steps of reacting 2,2-(4,4'-dihydroxydiphenyl)-propane with phosgene in the presence of dichloromethane, obtaining the polycarbonate in solution in said dichloromethane, said polycarbonate being present in an amount of 20 to 40 grams per 100 grams of said dichloromethane, mixing said solution with water and at least 2 cc. of dimethylbenzene per gram of polycarbonate, said water being present in an amount of 50–300 cc. per 100 cc. of dimethylbenzene, and evaporating said mixture to obtain the polycarbonate in powdered form.

4. A process for the preparation of powdered macromolecular polycarbonates comprising the steps of reacting 2,2-(4,4'-dihydroxydiphenyl)-propane with phosgene in the presence of trichloromethane, obtaining the polycarbonate in solution in said trichloromethane, said polycarbonate being present in an amount of 20 to 40 grams per 100 grams of said trichloromethane, mixing said solution with water and at least 2 cc. of dimethylbenzene per gram of polycarbonate, said water being present in an amount of 50 to 300 cc. per 100 cc. of dimethylbenzene, and evaporating said mixture to obtain the polycarbonate in powdered form.

5. A process for the preparation of powdered macromolecular polycarbonates comprising the steps of reacting 2,2-(4,4'-dihydroxydiphenyl)-propane with chlorocarbonic acid esters of 2,2-(4,4'-dihydroxydiphenyl)-propane in the presence of dichloromethane, obtaining the polycarbonate in solution in said dichloromethane, said polycarbonate being present in an amount of 20 to 40 grams per 100 grams of said dichloromethane, mixing said solution with water and at least 2 cc. of dimethylbenzene per gram of polycarbonate, said water being present in an amount of 50 to 300 cc. per 100 cc. of dimethylbenzene, and evaporating said mixture to obtain the polycarbonate in powdered form.

6. A process for the preparation of powdered macromolecular polycarbonates comprising the steps of reacting 2,2-(4,4'-dihydroxydiphenyl)-propane with chlorocarbonic acid esters of 2,2-(4,4'-dihydroxydiphenyl)-propane in the presence of trichloromethane, obtaining the polycarbonate in solution in said trichloromethane, said polycarbonate being present in an amount of 20 to 40 grams per 100 grams of said trichloromethane, mixing said solution with water and at least 2 cc. of dimethylbenzene per gram of polycarbonate, said water being present in an amount of 50 to 300 cc. per 100 cc. of dimethylbenzene, and evaporating said mixture to obtain the polycarbonate in powdered form.

7. A process for the preparation of powdered macromolecular polycarbonates comprising the steps of reacting 2,2-(4,4'-dihydroxydiphenyl)-propane with a compound of the group consisting of phosgene and chlorocarbonic acid esters of 2,2-(4,4'-dihydroxydiphenyl)-propane in the presence of a compound of the group consisting of dichloromethane, trichloromethane and mixtures thereof, obtaining the polycarbonate in solution in said compound, said polycarbonate being present in an amount of 20 to 40 grams per 100 grams of said compound, mixing said solution with at least 2 cc. of dimethylbenzene per gram of polycarbonate, said water being present in an amount of 50 to 300 cc. of dimethylbenzene, and passing steam through said mixture to evaporate the mixture whereby the polycarbonate is obtained in powdered form.

8. A process for the preparation of granular, macromolecular polycarbonates comprising the steps of reacting 2,2-(4,4'-dihydroxydiphenyl)-propane with a compound of the group consisting of phosgene and chlorocarbonic acid esters of 2,2-(4,4'-dihydroxydiphenyl)-propane in the presence of a compound of the group consisting of dichloromethane, trichloromethane and mixtures thereof, obtaining the polycarbonates in solution in said compound, said polycarbonate being present in an amount of 20 to 40 grams per 100 grams of said compound, mixing said solution with water and at least 2 cc. of dimethylbenzene per gram of polycarbonate, said water being present in an amount of 50 to 300 cc. per 100 cc. of dimethylbenzene, evaporating said mixture and during said evaporation, agitating said mixture whereby the polycarbonate is obtained in granular form.

References Cited in the file of this patent

FOREIGN PATENTS 578,585     Canada ---------------- June 30, 1959